(12) United States Patent
Chang et al.

(10) Patent No.: US 7,933,771 B2
(45) Date of Patent: Apr. 26, 2011

(54) SYSTEM AND METHOD FOR DETECTING THE RECOGNIZABILITY OF INPUT SPEECH SIGNALS

(75) Inventors: Sen-Chia Chang, Hsinchu (TW);
Yuan-Fu Liao, Hsinchu (TW);
Jeng-Shien Lin, San-Chung (TW)

(73) Assignee: Industrial Technology Research Institute, Hsinchu (TW)

( * ) Notice: Subject to any disclaimer, the term of this patent is extended or adjusted under 35 U.S.C. 154(b) by 1260 days.

(21) Appl. No.: 11/372,923

(22) Filed: Mar. 11, 2006

(65) Prior Publication Data

US 2007/0078652 A1      Apr. 5, 2007

(30) Foreign Application Priority Data

Oct. 4, 2005 (TW) .................... 94134669 A

(51) Int. Cl.
*G10L 15/00* (2006.01)
*G10L 21/00* (2006.01)

(52) U.S. Cl. ......... 704/233; 704/234; 704/231; 704/275

(58) Field of Classification Search .............. 704/233, 704/231, 275
See application file for complete search history.

(56) References Cited

U.S. PATENT DOCUMENTS

| | | | |
|---|---|---|---|
| 6,272,460 B1 | 8/2001 | Wu et al. | 704/226 |
| 7,072,834 B2* | 7/2006 | Zhou | 704/244 |
| 7,177,808 B2* | 2/2007 | Yantorno et al. | 704/246 |
| 2002/0038211 A1* | 3/2002 | Rajan | 704/233 |
| 2002/0107695 A1* | 8/2002 | Roth et al. | 704/275 |
| 2003/0046070 A1* | 3/2003 | Vergin | 704/233 |
| 2003/0191636 A1* | 10/2003 | Zhou | 704/226 |
| 2004/0181409 A1* | 9/2004 | Gong et al. | 704/256 |
| 2004/0260547 A1* | 12/2004 | Cohen et al. | 704/233 |
| 2005/0080627 A1* | 4/2005 | Hennebert et al. | 704/270 |
| 2005/0187763 A1* | 8/2005 | Arun | 704/226 |
| 2006/0023890 A1* | 2/2006 | Kaminuma | 381/18 |
| 2006/0053009 A1* | 3/2006 | Jeong et al. | 704/234 |

FOREIGN PATENT DOCUMENTS

TW          473704          1/2002

(Continued)

OTHER PUBLICATIONS

Assaleh, K.T., "Automatic evaluation of speaker recognizability of coded speech," Acoustics, Speech, and Signal Processing, 1996. ICASSP-96. Conference Proceedings., 1996 IEEE International Conference on , vol. 1, No. pp. 475-478 vol. 1, May 7-10, 1996.*

(Continued)

*Primary Examiner* — Richemond Dorvil
*Assistant Examiner* — Michael Ortiz Sanchez

(57) ABSTRACT

A system and method for detecting the recognizability of input speech signal is provided. It is designed in the pre-stage of speech recognition or a dialog system. The invention detects the user's environmental condition and verifies if the input speech signal can be recognized. It mainly comprises an environment parameter generator, a signal recognition verifier, and a strategy response processor. Through the use of the invention in the pre-stage of speech recognition or a dialog system, it can precisely verify the recognizability of the input speech signal and receives the input speech signals of high recognition probability in a noisy environment. This reduces the impact caused by receiving the input speech signals of low recognition probability. This invention thus increases the recognition probability for a recognizer.

25 Claims, 7 Drawing Sheets

FOREIGN PATENT DOCUMENTS

| TW | 574684 | 2/2004 |
| --- | --- | --- |
| TW | 1225638 | 12/2004 |

OTHER PUBLICATIONS

Bhiksha Raj, Michael L. Seltzer, Richard M. Stern, Reconstruction of missing features for robust speech recognition, Speech Communication, vol. 43, Issue 4, Special Issue on the Recognition and Organization of Real-World Sound, Sep. 2004, pp. 275-296.*

B. J. Borgstrom and A. Alwan "Missing feature imputation of log-spectral data for noise robust ASR", Workshop on DSP in Mobile and Vehicular Systems, p. 2009.*

* cited by examiner

SNRy : the SNR of the input signal y
Py : the probability of the input signal y being a speech
Ry : confidence index of the system processing the input signal y

| SNR | recognition rate (%) |
|---|---|
| noise-free environment | 94.2 |
| 20dB | 89.1 |
| 15dB | 82.8 |
| 10dB | 69.4 |
| 5dB | 42.4 |
| 0dB | 10.9 |
| average | 64.8 |

FIG. 6

|  | number of utterances | number of the utterances that the invention mistakenly verifies | error rate (%) |
|---|---|---|---|
| number of the utterances that cannot be recognized successfully | (A) 1976 | (B) 453 | 22.9 |
| number of the utterances that can be recognized successfully | (C) 3640 | (D) 807 | 22.2 |
| total number of the utterances | 5616 | 1260 | 22.4 |

FIG. 7

SYSTEM AND METHOD FOR DETECTING THE RECOGNIZABILITY OF INPUT SPEECH SIGNALS

FIELD OF THE INVENTION

The present invention generally relates to the field of speech recognition and more specifically to system and method for detecting the recognizability of input speech signals.

BACKGROUND OF THE INVENTION

The speech recognition system usually encounters various problems caused by the environments, such as background noise and the channel effect, or other factors of the speakers, such as the accent and the speaking rate, so that the input speech is beyond the recognition capability of the system. Prior researches proposed various improvements over the recognition capability, however, with only limited results.

U.S. Pat. No. 6,272,460, "Method for Implementing a Speech Verification System for Use in a Noisy Environment", disclosed a system including a speech verifier in the front stage of the system. As shown in FIG. 1, a speech verifier 100 includes a noise suppressor 110, a pitch detector 120, and a confidence determiner 130. The object is to rid of noises and obtain the pitch. The pitch value is translated into a time-variant confidence index for determining whether the input signal at a certain time is a speech. The confidence index is transferred to the recognizer for assisting the recognition.

U.S. Pat. No. 6,272,461 emphasized the speech detection and the assistance in speech recognition of all the input signals regardless of whether the input signals are beyond the acceptable range.

The current speech recognition or dialog system does not have the capability for sensing the environment of the usage. This implies that the system will blindly try to recognize the speech and generate an output no matter how harsh the usage environment is and no matter how the task is beyond the system capability. As a result, the user may receive an erroneous answer. This not only wastes the system resource, but also leads to potentially severe outcomes.

Take the auto-attendant as an example. When the caller uses the extension number inquiry system from a noisy subway station or on the busy street, the environmental noise will affect the signal-to-noise ratio (SNR) so that the SNR is too low and beyond the system capability. The system will perform the speech recognition process and generates a wrong extension number. At the end, the caller will need to request a customer service representative for the assistance. This scenario shows the waste of system resource and the failure of saving the manpower.

On the other hand, if the system can determine whether the input signal is within the recognizable range before the system starts the actual recognition process, the recognizable signals can be passed for recognition while the unrecognizable signals can be responded with appropriate actions. In this manner, the possibility of successful speech recognition will increase.

SUMMARY OF THE INVENTION

The present invention has been made to overcome the above-mentioned drawback of conventional speech recognition systems that have no capability in sensing the usage environment. The primary object of the present invention is to provide a system and a method for detecting the recognizability of the input speech signals.

In comparison with the conventional methods, the present invention includes the following characteristics: (a) The present invention emphasizes the front stage of the recognition system. By using a small amount of system resource to detect whether the input signal can be successfully recognized, the efficiency of the system can be improved. (b) The recognizable signals are passed to the recognizer for recognition, and unrecognizable signals are responded with appropriate actions. (c) The unrecognizable signals are not passed to the system for recognition so that the system resource is saved.

To achieve the above object, the present invention provides a system with a front stage for detecting the recognizabiliy of input speech signals, comprising an environment parameter generator, a signal recognition verifier, and a strategy response processor.

The system operates as follows. First, the environment parameter generator generates a plurality of parameters in accordance with the environment to represent the environment conditions or the input signal quality. Then, the signal recognition verifier, after the initial training, verifies whether the input signal is recognizable in accordance with the environment parameters. When the input signal is verified as recognizable, the input signal is passed to the recognition device for recognition. On the other hand, when the input signal is verified as unrecognizable, the strategy response processor is triggered to propose a strategy to respond to the environment or signal quality of the user in accordance with the environment parameters.

In the embodiment of the present invention, the environment parameter generator selects the SNR of the input signal, the probability of input signal being a speech, and confidence index of the system processing input signal as the environment parameters. The strategy response processor proposes different strategies to guide the user to improve. For example, when the SNR is low, the user is advised to raise the voice or move to a quieter environment. Or, when the confidence index is low, the user is advised to speak more clearly. Then, the user is prompted to input the signal again or is transferred to a customer service representative.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 6 shows the experimental results of the recognition rate for a simulated noise environment with six test sets.

FIG. 7 shows the output of the error of the failure and the success of recognition for the present invention.

DETAILED DESCRIPTION OF THE PREFERRED EMBODIMENTS

Figure 1:
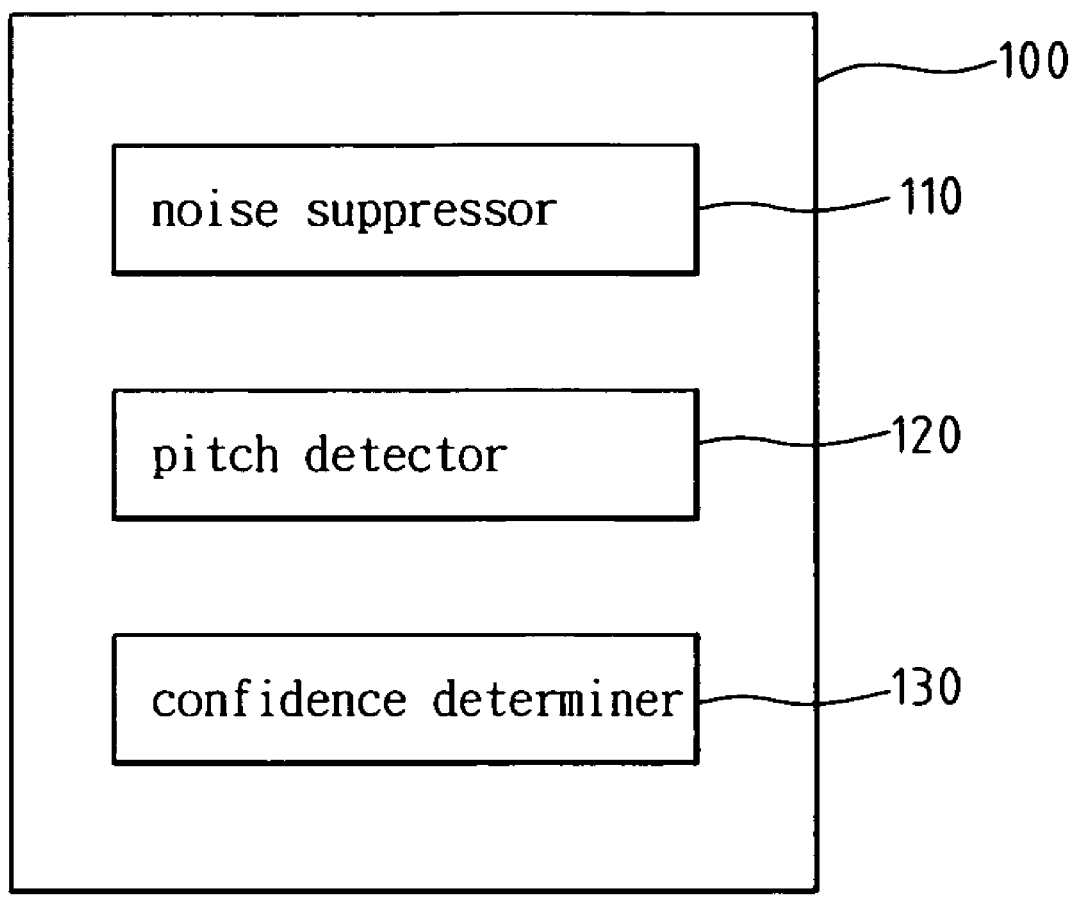
FIG. 1 shows a schematic view of a conventional speech recognition system and method in a noisy environment.
Figure 2:
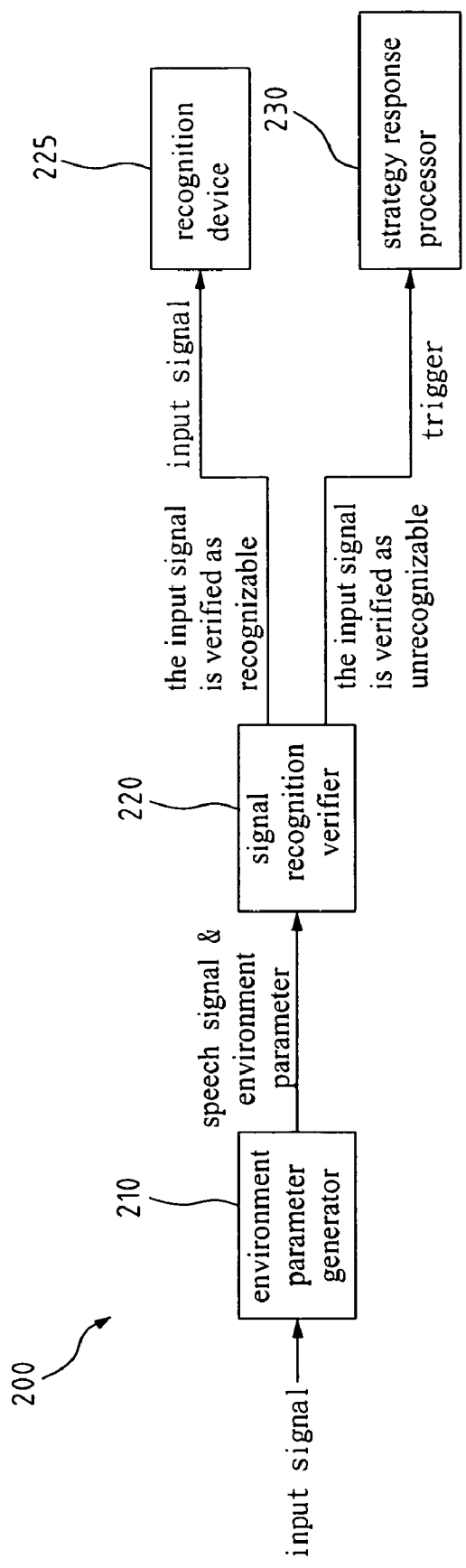
FIG. 2 shows a schematic view of a block diagram of the present invention.

As mentioned earlier, the speech recognition system for detecting the recognizability of the input speech emphasizes the front stage of the recognition or dialog system. FIG. 2 shows a schematic view of a block diagram of the present invention. As shown in FIG. 2, a speech recognition system 200 comprises an environment parameter generator 210, a signal recognition verifier 220 and a strategy response processor 230. The functionality of each component and the system operation is described as follows.

First, environment parameter generator 210 generates at least an environment parameter for the input signals. The environment parameter represents the environment conditions for the input signal or the input signal quality. Without the loss of generality, the embodiment of the present invention uses the SNR of the input signal, the probability of input signal being a speech, and the confidence index of system processing input signal as the environment parameters. These environment parameters can be generated by using voice activity detection (VAD) and missing feature imputation (MFI) to obtain a clean speech signal, and then a calculation is performed. The calculation of the environment parameters will be described later.

Then, signal recognition verifier 220, after the initial training with the environment parameters in advance, verifies whether the input signal is recognizable in accordance with the environment parameters. When the input signal is verified as recognizable, the input signal is passed to a recognition device 225 for further recognition. When the input signal is verified as unrecognizable, strategy response processor 230 is triggered to respond with a plurality of strategies to increase the possibility of successful recognition.

Figure 3:
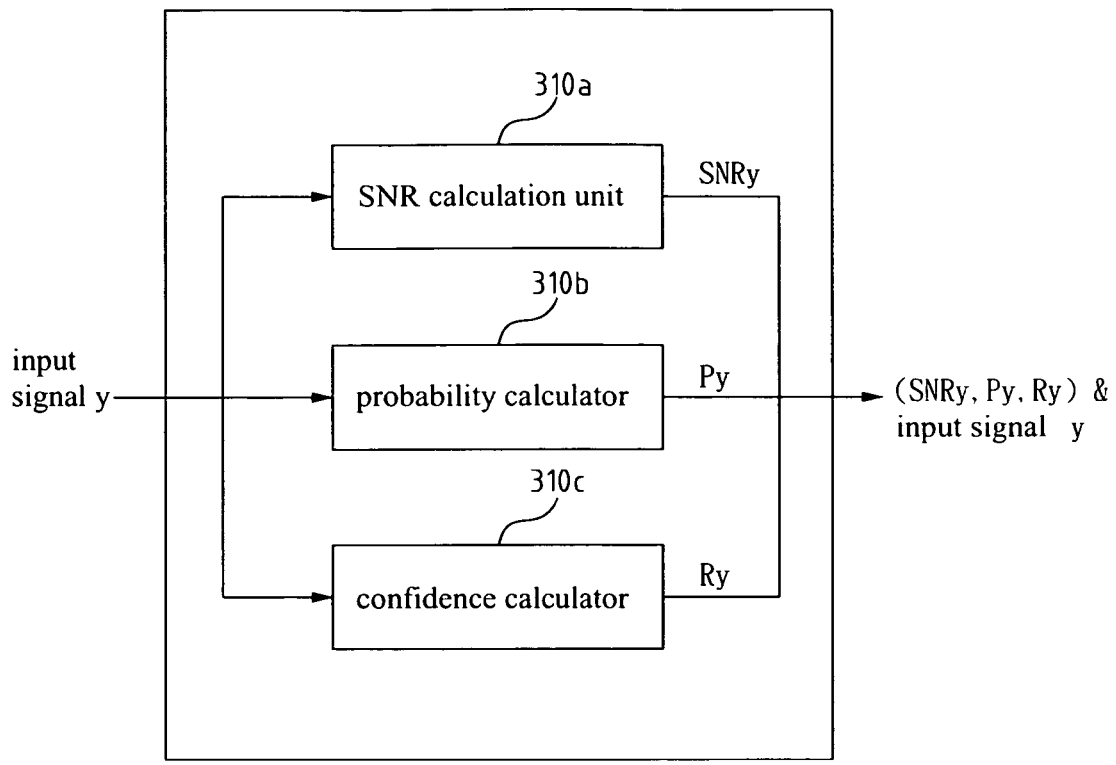
FIG. 3 shows a schematic view of the block diagram of the environment parameter generator of the present invention.

FIG. 3 shows a block diagram of the environment parameter generator of the present invention. The environment parameter generator includes a SNR calculation unit 310a, a probability calculator 310b for calculating the probability of the signal being a speech, and a confidence calculator 310c for calculating the confidence index of the system processing the input signal. The calculation of each calculator is described as follows.

In the application in an actual environment, the background noise usually directly affects the recognition rate of the system. Therefore, the present invention uses the SNR as the first environment parameter.

First, SNR calculator 310a uses the VAD method to detect the speech part x and the non-speech part (noise) $u_n$ from the spectrum feature of the input signal y. Then, the MFI method is used to clear the noise from the speech part x to obtain a clean speech signal $\hat{x}$. Based on noise $u_n$ and clean signal $\hat{x}$, the SNR of the input signal y, named $SNR_y$, is calculated. In general, the higher the SNR is, the higher the probability that a signal can be recognized successfully. The $SNR_y$ can be expressed as the following equation:

$$SNR(t) = \frac{\frac{1}{D} \cdot \sum_{d=0}^{D-1} \hat{x}(t, d)}{\frac{1}{D} \cdot \sum_{d=0}^{D-1} u_n(d)}, t = 0 \sim T-1$$

$$SNR_y = \max(SNR(t))$$

where SNR(t) is the SNR of the signal y at the time t, and T is the total length of the input signal. D is the total number of the frequency bands of the input signal frequency spectrum. $\hat{x}(t, d)$ is the clean speech spectrum feature parameter calculated by MFI method at time t and band d. $u_n(d)$ is the average of the noise spectrum feature parameter calculated by MFI method at band d. $SNR_y$ is the $SNR_y$ value of the input signal y.

In addition to the SNR, the present invention also uses the probability, $P_y$, of the input signal y being a speech as the second environment parameter. The larger the probability $P_y$ is, the easier the input signal can be recognized successfully.

First, probability calculator 310b uses the MFI method to calculate the probability that the SNR is greater than 0 when the clean signal spectrum parameter x is at time t and band d.

$$P(SNR(t, d) > 0) = \int_{-\infty}^{\hat{x}(t,d)/2} \frac{1}{\sqrt{2\pi} |\hat{\sigma}_n(d)|} e^{-\left(\frac{(\omega - \hat{\mu}_n(d))^2}{2\hat{\sigma}_n^2(d)}\right)} d\omega$$

where $\hat{\mu}_n(d)$ and $\hat{\sigma}_n^2(d)$ are the average and the variance of noise spectrum distribution calculated by MFI method, respectively. $\omega$ is the value of the noise.

Then, the MFI method is used to calculate the probability that the clean signal spectrum is a speech at time t, as follows:

$$R(t) = \frac{1}{D} \cdot \sum_{d=0}^{D-1} P(SNR(t, d) > 0), t = 0 \sim T-1$$

where D is the number of the bands of the signal spectrum and T is the total length of the input signals.

Finally, the probability of the input signal y being a speech is calculated as follows:

$$P_y = 1/T \sum_{t=0}^{T-1} R(t)$$

The present invention uses the confidence index of the system processing the signal as the third environment parameter. The larger the confidence index is, the easier the input signal can be recognized successfully.

First, confidence calculator 310c measures the divergence between the input signal y and the known system model distribution x on the frequency spectrum, as expressed in the following equation:

$$D(y \| x) = \int [p(y) - p(x)] \log\left(\frac{p(y)}{p(x)}\right) dx$$

where p(y) is the probability distribution of the spectrum parameter of the signal y, and p(x) is the probability distribution of the spectrum parameter of the system model. The larger the divergence $D(y\|x)$ is, the lower the probability that the input signal can be recognized successfully is.

Then, the divergence $D(y\|x)$ is transformed by a Sigmoid function into a confidence index $R_y$ between 0 and 1:

$$R_y = \frac{1}{1 + \exp(-\alpha(D + \beta))}$$

where $\alpha$ and $\beta$ are the fine-tuning parameters for enlargement and shift, respectively.

Figure 4:
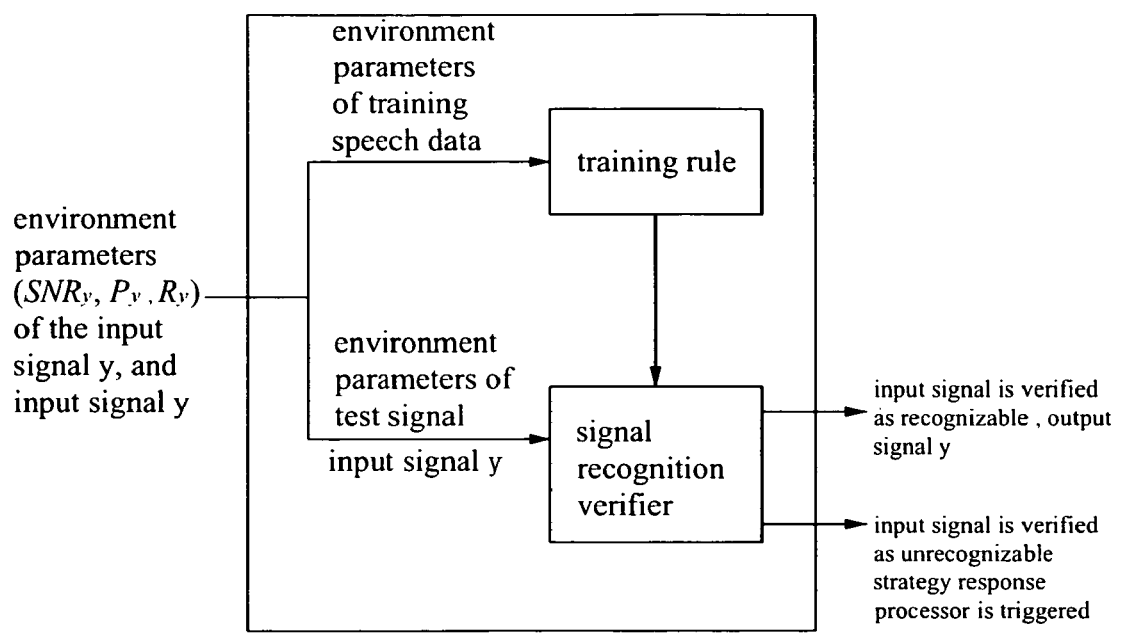
FIG. 4 shows a schematic view of the block diagram of the signal recognition verifier of the present invention.

After the three environment parameters $SNR_y$, $P_y$ and $R_y$ are calculated, signal recognition verifier 220, after the initial training with the environment parameters in advance, receives and analyzes the three environment parameters $SNR_y$, $P_y$ and $R_y$ to verify whether the input signal is recognizable, as shown in FIG. 4. The training rule with the environment parameters can be the multi-layer perception (MLP) method of the pattern classification.

Figure 5:
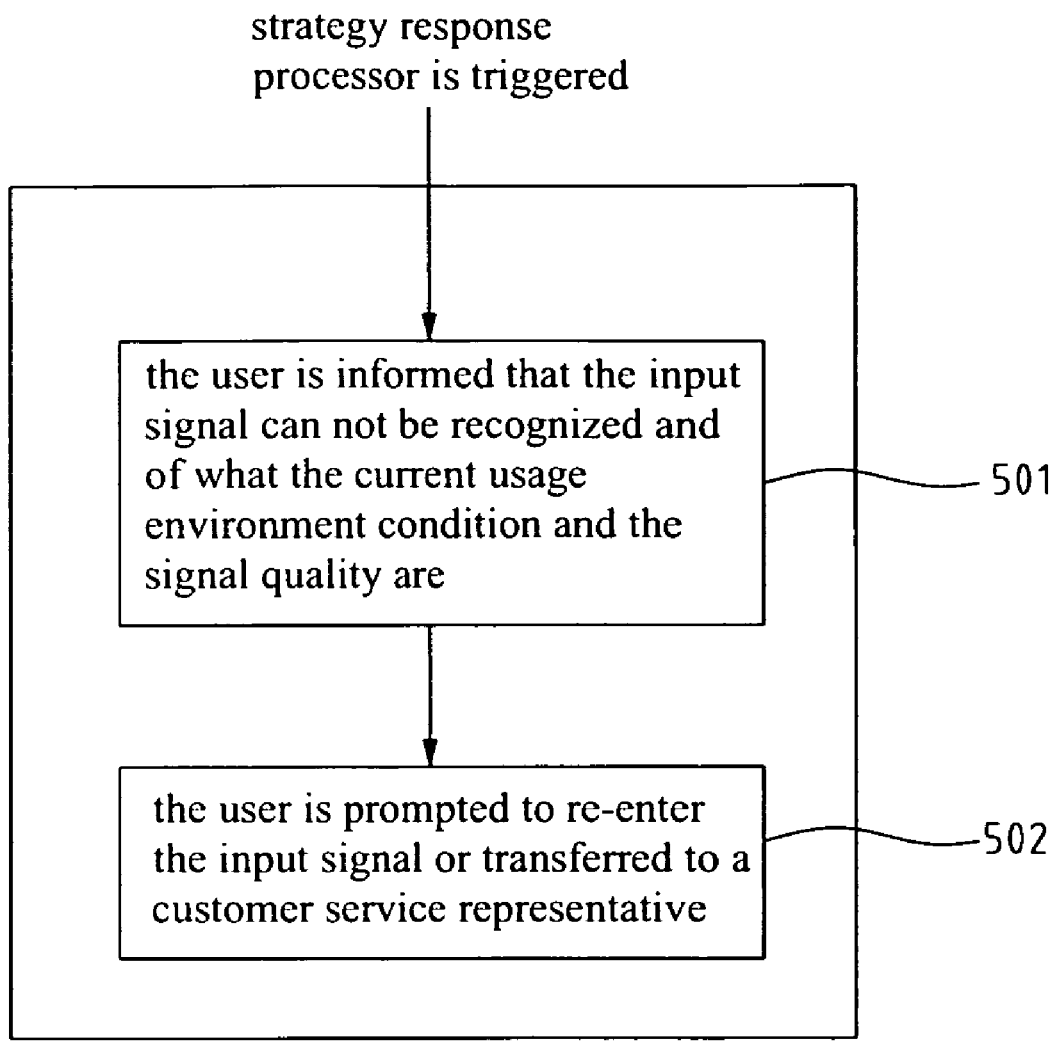
FIG. 5 shows an embodiment of the strategy response processor of the present invention.

As aforementioned, when the input signal is verified as unrecognizable by the signal recognition verifier 220, the strategy response processor 230 is triggered to respond with strategies. There are a plurality of possible strategies. FIG. 5 shows a working example of the strategy. In this working example, the user is informed that the input signal can not be recognized and of what the current usage environment condition and the signal quality are, such as step 501, to guide the user to improve the environment condition and the signal quality. For example, when the SNR is lower than a threshold, the user is advised to raise the voice or move to a quieter location. When the confidence index of the system processing the signal is lower than a threshold, the user is advised to speak more clearly. Then, the user is prompted to re-enter the input signal or transferred to a customer service representative, as step 502.

In an experiment with 936 clean speech utterances of Chinese names, a babble noise of five different SNR between 0 dB and 20 dB is added to simulate the noise environment and generate six sets of tests, 5616 test signals in total. With the noise interference, the recognition rate of the six sets of tests is shown in FIG. 6. In a noise-free environment, the recognition rate is 94.2%. When the babble noise is added, the average recognition rate for the six sets of tests is reduced to 64.8%.

It is obvious that the system recognition rate decreases rapidly as the SNR decreases. With the present invention adding the aforementioned detection method in the front stage of the recognition system, the environment parameters are generated for every unrecognizable and recognizable signal. FIG. 7 shows the output of the error rate for the recognizable and unrecognizable signals, respectively.

In FIG. 7, A represents the number of the utterances that the recognition device cannot recognize successfully, and B represents the number of the utterances that the present invention mistakenly verifies as recognizable. Similarly, C represents the number of the utterances that the recognition device can recognize successfully, and D represents the number of the utterances that the present invention mistakenly verifies as unrecognizable. The average recognition rate of the recognition device is calculated as the ratio between the number of the correctly recognized utterances and the number of the utterances entering the recognition device, that is, $(C-D)/(C-D+B)=(3640-807)/(3640-807+453)=86.2\%$.

As seen in the above results, after the detection method of the present invention is added to the front stage of the recognition system, the recognition rate is improved from 64.8% to 86.2%, and the unrecognizable signals are rejected to prevent further effect of the erroneous recognition.

In summary, the present invention provides a system and a method for detecting the recognizability of the input signal. The present invention is to detect the usage environment conditions and the signal quality in the front stage of the recognition system to verify whether the signal can be recognized successfully. In the present invention, three environment parameters, including SNR, the probability of the signal being a speech, and the confidence index of the system processing the signal, are used to represent the environment conditions and the signal quality. The environment parameters are used to train the signal recognition verifier to verify whether the signal can be recognized successfully. When the signal is verified as recognizable, the signal is passed to the recognition device for recognition. When the signal is verified as unrecognizable, a strategy response processor is triggered to inform the user of the environment conditions and prompt the user for inputting better quality signals.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A system for detecting recognizability of an input signal, said system being a front stage of a speech recognition device or a dialog device, and comprising:
   an environment parameter generator to generate at least one environment parameter from an input signal by using a voice activity detection (VAD) method and a missing feature imputation (MFI) method wherein the MFI method comprises a step of calculating a clean speech spectrum feature parameter, said at least one environment parameter including a confidence index of said system processing said input signal;
   a signal recognition verifier to verify whether said input signal is recognizable in accordance with said at least one environment parameter, said signal recognition verifier being trained with environment parameters in advance; and
   a strategy response processor;
   wherein said confidence index is generated based on a probability distribution of a spectrum parameter of said input signal and the probability distribution of the spectrum parameter of a system model, and said input signal is passed to said speech recognition or dialog device when said input signal is verified as recognizable; while said strategy response processor is triggered to respond with a plurality of strategies when said input signal is verified as unrecognizable.

2. The system as claimed in claim 1, wherein said at least one environment parameter represents environment conditions or signal quality of said input signal.

3. The system as claimed in claim 1, wherein said at least one environment parameter further includes signal-to-noise ratio (SNR) of said input signal, and a probability of said input signal being speech or any combination of the environment parameters, and said signal recognition verifier is trained with environment parameters in advance using multi-layer perception (MLP) method of pattern classification.

4. The system as claimed in claim 3, wherein said environment parameter generator includes an SNR calculator, a probability calculator, and a confidence measure, for calculating said SNR, said probability of said input signal being speech, and said confidence index of said system processing said input signal, respectively.

5. The system as claimed in claim 4, wherein one of said plurality of strategies is to inform a user of environment conditions and signal quality, and provide said user with corresponding solutions.

6. The system as claimed in claim 5, wherein said environment conditions and signal quality of said input signal include said SNR of said input signal, said probability of said input signal being speech, and said confidence index of said system processing said input signal.

7. The system as claimed in claim 5, wherein said corresponding solutions include ways to improve said environment conditions and signal quality.

8. The system as claimed in claim 7, wherein said ways include raising user's voice, changing to a quieter location, raising speech clarity, and giving up recognition process.

9. The system as claimed in claim 8, wherein said user is prompted to raise the voice, change to a quieter location and re-input the signal when said SNR is lower than a threshold.

10. The system as claimed in claim 8, wherein said user is prompted to raise the speech clarity and re-input the signal when said confidence index is lower than a threshold.

11. The system as claimed in claim 8, wherein solutions for said giving up recognition process include transferring said user to a customer service representative.

12. A method for detecting the recognizability of an input signal, said method being implemented in a front stage of a speech recognition or dialog device, and comprising the steps of:
(a) generating at least one environment parameter for said input signal by using a voice activity detection (VAD) method and a missing feature imputation (MFI) method wherein the MFI method comprises a step of calculating a clean speech spectrum feature parameter, said at least one environment parameter including a confidence index of said system processing said input signal;
(b) using said at least one environment parameter to verify whether said input signal is recognizable according to verification training with environment parameters in advance; and
(c) passing said input signal to said speech recognition or dialog device when said input signal is verified as recognizable; otherwise, triggering a strategy response processor to provide a plurality of strategies when said input signal is verified as unrecognizable;
wherein said confidence index is generated based on a probability distribution of a spectrum parameter of said input signal and the probability distribution of the spectrum parameter of a system model.

13. The method as claimed in claim 12, wherein said at least one environment parameter in said step (a) further includes signal-to-noise ratio (SNR) of said input signal, a probability of said input signal being speech or any combination of the environment parameters, and said verification training is trained with environment parameters in advance using multi-layer perception (MLP) method of pattern classification.

14. The method as claimed in claim 13, wherein generation of said SNR comprises the following steps of:
using said VAD method on a spectrum feature parameter of said input signal to detect a speech part and a non-speech part of said input signal;
using said MFI method to eliminate noise from said speech part to obtain a clean speech signal; and
calculating said SNR of said input signal in accordance with said non-speech part and said clean speech signal.

15. The method as claimed in claim 14, wherein generation of said probability of said input signal being speech comprises the steps of:
using said MFI method to calculate the probability of said SNR being greater than 0 when said clean signal spectrum is at a time t and a band d;
using said MFI method to calculate a probability R(t) of said clean signal spectrum being speech at said time t; and
calculating the average of said R(t) during the total length of said input signal to obtain said probability of said input signal being speech.

16. The method as claimed in claim 12, wherein generation of said confidence index comprises the steps of:
measuring the divergence between said input signal and a known system model distribution on frequency spectrum; and
using a sigmoid function to transform said divergence into a confidence index between 0 and 1.

17. The method as claimed in claim 12, wherein said verification training with environment parameters uses a multi-layer perception method of pattern classification.

18. The method as claimed in claim 13, wherein one of said plurality of strategies of said step (c) is to inform a user of environment conditions and signal quality, and provide said user with corresponding solutions.

19. The method as claimed in claim 18, wherein said environment conditions and signal quality of said input signal include said SNR of said input signal, said probability of said input signal being speech, and said confidence index of said system processing said input signal.

20. The method as claimed in claim 18, wherein said corresponding solutions include ways to improve said environment conditions and signal quality.

21. The method as claimed in claim 20, wherein said ways include raising user's voice, changing to a quieter location, raising speech clarity, and giving up recognition process.

22. The method as claimed in claim 21, wherein said user is prompted to raise the voice or change to a quieter location and re-input the signal when said SNR is lower than a threshold.

23. The method as claimed in claim 21, wherein said user is prompted to raise the speech clarity and re-input the signal when said confidence index is lower than a threshold.

24. The method as claimed in claim 21, wherein solutions for said giving up recognition process include transferring said user to a customer service representative.

25. A method for detecting the recognizability of an input signal, said method being implemented in a front stage of a speech recognition or dialog device, and comprising the steps of:
(a) generating at least one environment parameter for said input signal by using a voice activity detection (VAD) method and a missing feature imputation (MFI) method wherein the MFI method comprises a step of calculating a clean speech spectrum feature parameter, said at least one environment parameter including a confidence index of said system processing said input signal;
(b) using said at least one environment parameter to verify whether said input signal is recognizable according to verification training with environment parameters in advance; and
(c) passing said input signal to said speech recognition or dialog device when said input signal is verified as recognizable; otherwise, triggering a strategy response processor to provide a plurality of strategies when said input signal is verified as unrecognizable;
wherein said confidence index is generated based on a probability distribution of a spectrum parameter of said input signal and the probability distribution of the spectrum parameter of a system model by using the steps of:
measuring the divergence between said input signal and a known system model distribution on frequency spectrum; and
using a sigmoid function to transform said divergence into a confidence index between 0 and 1.

* * * * *